(12) United States Patent
Ramalingam et al.

(10) Patent No.: US 12,696,137 B2
(45) Date of Patent: Jul. 28, 2026

(54) CPRI LINK-RATE AUTO-NEGOTIATION BASED ON AVAILABLE BANDWIDTH IN ETHERNET-BASED FRONTHAUL NETWORK

(71) Applicant: Cisco Technology, Inc., San Jose, CA (US)

(72) Inventors: Manoj Ramalingam, Bengaluru (IN); Rajasekar Natarajan, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 409 days.

(21) Appl. No.: 17/742,163

(22) Filed: May 11, 2022

(65) Prior Publication Data

US 2023/0370900 A1 Nov. 16, 2023

(51) Int. Cl.
| | |
|---|---|
| *H04W 28/18* | (2009.01) |
| *H04W 28/12* | (2009.01) |
| *H04W 28/24* | (2009.01) |
| *H04W 84/20* | (2009.01) |
| *H04W 88/18* | (2009.01) |
| *H04W 88/08* | (2009.01) |

(52) U.S. Cl.
CPC .......... *H04W 28/18* (2013.01); *H04W 28/12* (2013.01); *H04W 28/24* (2013.01); *H04W 84/20* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 5,881,050 A | * | 3/1999 | Chevalier | H04L 47/801 |
| | | | | 370/254 |
| 6,216,006 B1 | * | 4/2001 | Scholefield | H04L 47/283 |
| | | | | 455/452.2 |
| 9,807,035 B1 | * | 10/2017 | Hanks | H04L 49/15 |
| 2003/0084144 A1 | * | 5/2003 | Lipinski | H04L 41/5003 |
| | | | | 709/224 |
| 2003/0097443 A1 | * | 5/2003 | Gillett | H04L 67/563 |
| | | | | 709/219 |
| 2005/0226251 A1 | * | 10/2005 | Krzanowski | H04L 47/822 |
| | | | | 370/395.41 |

(Continued)

*Primary Examiner* — Scott M Sciacca
(74) *Attorney, Agent, or Firm* — Polsinelli P.C.

(57) ABSTRACT

The present disclosure is directed to directed to link-rate auto-negotiation between a radio equipment controller (REC) and a radio equipment (RE) in an Ethernet-based fronthaul network subject to bandwidth availability in the fronthaul network. In one aspect, a method includes determining, at a first proxy element in an Ethernet-based fronthaul network, that a new common public radio interface (CPRI) circuit is to be provisioned for packet exchange between a radio equipment control (REC) element and a radio equipment (RE) element of the Ethernet-based fronthaul network; performing, by at least one of the first proxy element and a second proxy element, an auto-negotiation for a link-rate for the new CPRI circuit, the link-rate being negotiated subject to a constraint, the constraint being an available bandwidth between the first proxy element and the second proxy element; and provisioning the new CPRI circuit with the link-rate.

18 Claims, 5 Drawing Sheets

MASTER TRANSMIT DURATION FOR ONE RATE

(56)                        References Cited

U.S. PATENT DOCUMENTS

| | | | | |
|---|---|---|---|---|
| 2009/0006277 A1* | 1/2009 | Johri | ................... | H04L 41/0896 |
| | | | | 705/400 |
| 2010/0002580 A1* | 1/2010 | DelRegno | ............... | H04L 47/10 |
| | | | | 370/252 |
| 2011/0134801 A1* | 6/2011 | Maruhashi | ............. | H04L 69/24 |
| | | | | 370/255 |
| 2011/0141895 A1* | 6/2011 | Zhang | .................... | H04L 12/66 |
| | | | | 370/328 |
| 2017/0279684 A1* | 9/2017 | Khalil | ................. | H04L 43/0876 |
| 2018/0070246 A1 | 3/2018 | Jack et al. | | |
| 2019/0190588 A1* | 6/2019 | Higgins | ................ | H04W 48/16 |
| 2019/0245740 A1 | 8/2019 | Kachhla | | |
| 2020/0244725 A1* | 7/2020 | Yamagishi | .......... | H04L 67/1014 |
| 2020/0366542 A1 | 11/2020 | Barbieri et al. | | |
| 2021/0084541 A1 | 3/2021 | Anand et al. | | |
| 2021/0360555 A1 | 11/2021 | Anand et al. | | |
| 2024/0089078 A1* | 3/2024 | Deng | ........................ | H04L 7/10 |

* cited by examiner

CPRI LINK-RATE AUTO-NEGOTIATION BASED ON AVAILABLE BANDWIDTH IN ETHERNET-BASED FRONTHAUL NETWORK

TECHNICAL FIELD

The present disclosure relates to communication systems, and in particular, to systems and methods for providing link auto-negotiation between a radio equipment controller (REC) and radio equipment (RE) in an Ethernet-based fronthaul network that is subject to available bandwidth in the fronthaul network.

BACKGROUND

Mobile networking architectures have grown increasingly complex in communication environments. In particular, access network configurations for used in mobile networking architectures have become more complex. These complexities have elevated the importance of improving the efficiency and reliability of communications among access network elements such as a radio equipment controller and radio equipment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
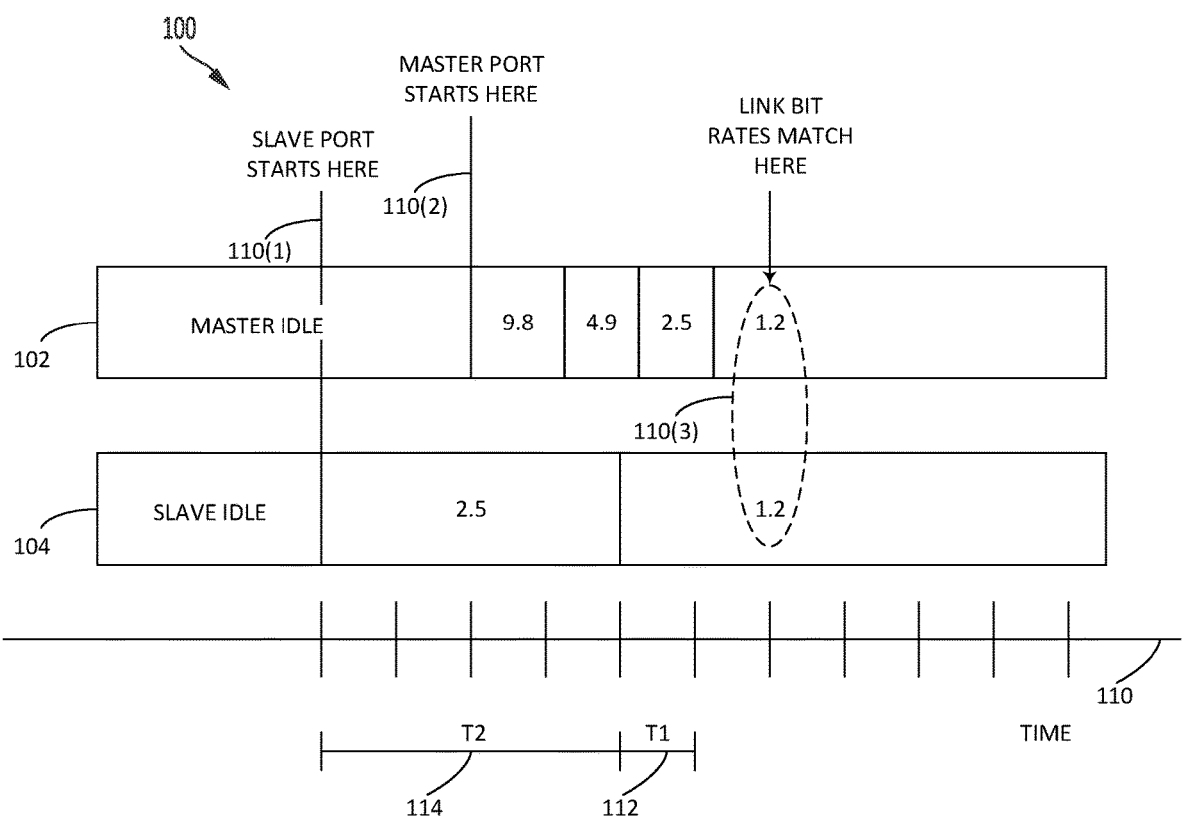
FIG. 1 is a simplified diagram again illustrating example details associated with Common Public Radio Interface (CPRI) link bit rate negotiation.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media directed to link-rate auto-negotiation between a radio equipment controller (REC) and a radio equipment (RE) in an Ethernet-based fronthaul network subject to bandwidth availability in the fronthaul network (e.g., available bandwidth between a proxy master and a proxy slave associated with the REC and RE). Using techniques described herein, a network operator can deploy Common Public Radio Interface (CPRI)-based REC and RE of varied capabilities in an Ethernet-based fronthaul network and the techniques discussed for embodiments herein can be used to achieve end-to-end CPRI link synchronization between the REC and RE. Negotiating a link-rate that may be higher than the available bandwidth in the front-haul network may put the CPRI circuit in a Los of Signal (LOS)/Loss of Frame (LOF) state thus rendering it unusable. The techniques described herein prevent such scenarios by subjecting the negotiated link-rate to available bandwidth in the fronthaul network.

In one aspect, a method includes determining, at a first proxy element in an Ethernet-based fronthaul network, that a new common public radio interface (CPRI) circuit is to be provisioned for packet exchange between a radio equipment control (REC) element and a radio equipment (RE) element of the Ethernet-based fronthaul network; performing, by at least one of the first proxy element and a second proxy element, an auto-negotiation for a link-rate for the new CPRI circuit, the link-rate being negotiated subject to a constraint, the constraint being an available bandwidth between the first proxy element and the second proxy element; and provisioning the new CPRI circuit with the link-rate.

In another aspect, the first proxy element is a proxy-master element communicatively coupled to the RE element and the second proxy element is a proxy-master element communicatively coupled to the REC element.

In another aspect, the first proxy element is a proxy-slave element communicatively coupled to the REC element and the second proxy element is a proxy-master element communicatively coupled to the RE element In another aspect, the REC element is a base band unit (BBU) of a cellular base station and the RE element is a remote radio headend (RRH) of the cellular base station.

In another aspect, the method further includes determining the available bandwidth as a total bandwidth on an ethernet interface between the first proxy element and the second proxy element minus a current load on the ethernet interface.

In another aspect, the first proxy element and the second proxy element are configured to auto-negotiate the link-rate from among a plurality of rates with a respective one of the REC element and the RE element.

In another aspect, the link-rate is selected as one of the plurality of rates that does not exceed the constraint.

In one aspect, an Ethernet-based fronthaul network includes a first network element communicatively coupled to a radio equipment control (REC) element in the Ethernet fronthaul network and a second network element communicatively coupled to a radio equipment (RE) element in the Ethernet fronthaul network. At least one of the first network element and the second network element is configured to determining that a new common public radio interface (CPRI) circuit is to be provisioned for packet exchange between the REC and the RE; perform an auto-negotiation for a link-rate for the new CPRI circuit, the link-rate being negotiated subject to a constraint, the constraint being an available bandwidth between the network element and the second network element; and provision the new CPRI circuit with the link-rate.

In one aspect, one or more non-transitory computer-readable media comprising computer-readable instructions, which when executed by one or more processors associated with a first proxy element or a second proxy element of an Ethernet-based fronthaul network, cause at least one of the first proxy element and the second proxy element to determine that a new common public radio interface (CPRI) circuit is to be provisioned for packet exchange between a radio equipment control (REC) element and a radio equipment (RE) element of the Ethernet-based fronthaul network; perform an auto-negotiation for a link-rate for the new CPRI circuit, the link-rate being negotiated subject to a constraint, the constraint being an available bandwidth between the first proxy element and the second proxy element; and provision the new CPRI circuit with the link-rate.

EXAMPLE EMBODIMENTS

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. Internet Protocol (IP) addresses discussed herein and in the claims can include IP version 4 (IPv4) and/or IP version 6 (IPv6) addresses. For example, various Layer 1 (L1) and/or Layer 2 (L2) communications/operations may be referenced herein.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element or node.

In general, 3rd Generation Partnership Project (3GPP) mobile network architectures such as 3GPP Long Term Evolution (LTE) architectures, sometimes referred to as 4th Generation (4G)/LTE architectures, as well as 3GPP 5th Generation (5G) architectures can be implemented via a core network and one or more 3GPP access networks in which user equipment (UEs) connect to a core network via over-the-air Radio Frequency (RF) communications with radio units or radio equipment (RE) of the access networks. Some 3GPP access networks can be implemented in a configuration that includes a radio equipment controller (REC) that interfaces with the core network and also interfaces with one or more RE. Both the REC and RE are two basic building blocks of a radio base station. The REC is concerned with the Network Interface transport, the radio base station control and management as well as the digital baseband processing. The RE provides the analogue and radio frequency functions via a radio head such as filtering, modulation, frequency conversion and amplification or, more generally, RE serves as the air interface, to the user equipment.

In current deployments of co-located REC and RE, the Common Public Radio Interface (CPRI) is used as directly connected bi-directional point-to-point over fiber. In general, CPRI is a point-to-point bit synchronous serial data link between the co-located REC and the RE providing an 'always ON constant bit rate' steady data stream. As referred to herein, the terms 'data link' and 'link' can be used interchangeably.

FIG. 1 is a simplified diagram again illustrating example details associated with Common Public Radio Interface (CPRI) link bit rate negotiation. Example diagram 100 of FIG. 1 illustrates the transmit link bit rates (which may also be referred to as simply link-rate) 102 for a CPRI bit stream transmitted by the master port (REC) and receive/decode link bit rates 104 at which a slave port (RE) attempts to receive and decode the master port (REC) transmitted CPRI bit stream in relation to times 110(1)-110(3), as represented along a time axis 110.

In some examples, a REC can be a base band unit (BBU) of a cellular base station and the RE can be a remote radio headend (RRH) of the cellular base station. The cellular base station can be a 4G/LTE base station, a 5G e-NodeB, etc.

A CPRI link auto-negotiation is performed to negotiate a common matching link bit rate for establishing the bi-directional CPRI data link between co-located REC and RE. CPRI Specification version 7.0 (v7.0), published Oct. 9, 2015, describes the current procedure for link auto-negotiation between REC and RE in direct-connected deployments, in which the master port (REC) drives the link bring-up with the slave port (RE) and link bit rate auto-negotiation, L1 synchronization, and frame synchronization/alignment all happen together directly between the co-located REC and RE. For CPRI Specification v7.0, bit rate is referred to as 'line bit rate'; however, for purposes of discussions herein, the term 'link bit rate' will be used. Further as referred to herein, the terms 'link auto-negotiation', 'link negotiation', 'link-rate negotiation' and 'link bit-rate negotiation', may be used interchangeably. Further as referred to herein, the terms 'synchronization' and 'sync' may be used interchangeably.

CPRI L1 synchronization accomplishes two things between the master and slave ports: byte alignment and hyper frame alignment for CPRI bit streams transmitted via the data link between the co-located REC and RE at a common matching link bit rate for the master and slave. Following frame synchronization/alignment, negotiations associated with protocol setup and control and management (C&M) setup, also referred to as L2 negotiations, are performed to determine a highest common matching link bit rate for the master and slave (if not already selected during the L1 sync) and also to determine a CPRI (in-band) C&M channel bit rate, C&M protocol, and vendor specific negotiations/signaling.

Current, for CPRI Link auto-negotiation, the following procedure is used to arrive at a common matching link bit rate as per CPRI Specification v7.0:

Master Port Actions:
1. The master port starts to transmit a CPRI bit stream at the highest available link bit rate directly and also starts to attempt receiving a CPRI bit stream (e.g., from the slave port) at the same link bit rate. If the frame alignment is not reached with the slave port, it selects the next highest link bit rate from its rate table (e.g., capability set) for transmission after a T1 time interval (0.9-1.1 seconds), if available.

2. Each following T1 time interval, a new link bit rate is chosen for transmission and reception (if available).
3. The link bit rates are selected from the available set in a round robin fashion, i.e. the first highest, the second highest, and so on to the slowest, and then restarting from the highest link bit rate.

Slave Port Actions:
1. The slave port starts attempting to receive a CPRI bit stream (e.g., from the master port) at the highest available link bit rate directly. If the frame alignment is not reached with master port, it selects another link bit rate for CPRI bit stream reception after a T2 time interval (3.9-4.1 seconds), if available.
2. Each following T2 time interval, a new reception link bit rate is chosen for reception (if available).
3. The link bit rates are selected from an available set (sometimes referred to as a 'capability set') in a round robin fashion, i.e. the first highest, the second highest, and so on to the slowest, and then restarting from the highest link bit rate.
4. When the slave port reaches a Hyper Frame Number (HFN) sync it starts transmitting a CPRI bit stream toward the master port on the same link bit rate. As prescribed by CPRI Specification v7.0, HFN sync is achieved by a CPRI port upon four consecutive successful detections of a SYNC byte in a CPRI bit stream received by the CPRI port. When the master port is able to receive and decode the slave port transmitted CPRI bit stream (e.g., achieve HFN sync), since the master port is also tuned at the same link bit rate, the link negotiations are considered complete and L1 synchronization is achieved as both nodes are able to communicate with each other now.

The above 7 steps are repeated until a common link bit rate match is achieved between the co-located REC and RE.

Consider an example as illustrated in FIG. 1. If a master port (REC) has a capability set in which it is capable of {9.8, 4.9, 2.5, and 1.2} Gigabits per second (Gbps) CPRI link bit rates and the slave port (RE) is capable of {2.5 and 1.2} Gbps CPRI link bit rates, the following occurs:

Master port starts transmitting a CPRI bit stream at a time 110(2) and changes it's transmit link bit rate 102 after every T1 (09-1.1. seconds) time interval 112.

Slave port starts attempting to receive/decode at a time 110(1) (earlier than the time 110(2) at which the master port starts transmitting) and changes its receive/decode link bit rate 104 after every T2 (3.9-4.1 seconds) time interval 114.

Both continue until a matching link bit rate is found and HFN sync is achieved, as shown at a time 110(3).

While the link negotiation procedure can be performed according CPRI Specification v7.0 when the REC and RE are co-located and directly connected, the procedure cannot work in fronthaul networks in which the REC and RE are interconnected through one or more intermediate nodes via a packet-based network, such as an Ethernet network.

The presence of the intermediate nodes in a fronthaul network poses a discontinuity problem for establishing the CPRI link negotiation (e.g., comprising link bit rate negotiation, L1 synchronization, and frame synchronization/alignment) between the REC and RE using the process prescribed by CPRI Specification v7.0. In fronthaul networks, the REC and RE endpoints cannot communicate directly with each other due to presence of CPRI interfacing Ethernet nodes as all these nodes may be running at different rates. Without having a commonly understandable CPRI link bit rate across the entire CPRI path for the CPRI interfacing nodes, the end-to-end CPRI link negotiation cannot be achieved.

In a fronthaul network, the REC and RE do not interact directly. Instead, ethernet nodes capable of CPRI mapping and de-mapping (e.g., mapping and de-mapping between a CPRI bit stream and Ethernet frames and vice-versa, depending on the direction of communications, discussed in further detail below) interface with the REC and RE. The Ethernet node capable of CPRI mapping/de-mapping connected directly to the REC is referred to herein as a 'Proxy Slave' or a 'CPRI Proxy Slave' and the Ethernet node capable of CPRI mapping/de-mapping connected directly to the RE is referred to herein as a 'Proxy Master' or a 'CPRI Proxy Master.' The Proxy Master and the Proxy Slave nodes may be referred to generally as 'proxy nodes.'

In a typical fronthaul network, the Proxy Master and Proxy Slave can communicate over a packet-based network, such as an Ethernet network, using Radio over Ethernet (RoE) communications, as prescribed by the Institute of Electrical and Electronics Engineers (IEEE) 1914.1 and IEEE 1914.3 Specifications, approved Sep. 27, 2018. IEEE 1914.1 and 1914.3 (referred to herein as 'IEEE 1914 standards') provide standards for encapsulation and mapping/de-mapping of radio data, such as CPRI bit streams, and/or potentially control and/or management packets within Ethernet frames. For a given Ethernet frame, radio data and/or potentially control and/or management packets can be included within a RoE frame that is encapsulated in the Ethernet frame. As discussed in further detail herein, a RoE frame can include an RoE header and an RoE payload.

The IEEE 1914 standards define different RoE mappers/de-mappers, including: structure-aware, structure-agnostic, and native mode in which structure-aware mapping/de-mapping operations can be used for CPRI data, structure-agnostic mapping/de-mapping operations can be used for any digitized radio data, and native mode mapping/de-mapping operations can be used for digitized radio In-phase/Quadrature (I/Q) payload data.

The structure-agnostic RoE mapper is considered for example embodiments described herein. While the IEEE 1914.1 and IEEE 1914.3 Specifications provide standards for encapsulation and mapping of CPRI bit streams over packet-based fronthaul transport networks, the standards do not cover how end-to-end link negotiations can be performed between an REC and RE in fronthaul networks.

Further, current CPRI link negotiation processes as prescribed by CPRI Specification v7.0 will not work in fronthaul networks. Recall, the key points for end-to-end CPRI link negotiation as prescribed by CPRI Specification v7.0 are:

1. That the HFN sync shall be achieved directly between REC and RE.
2. That the current non-fronthaul CPRI negotiation is a probabilistic method as the slave and master attempt different link rates at the same time. Rates are changed at both ends after different intervals; the master changes the link rate for transmission every 0.9-1.1 seconds and the slave changes the link rate for reception every 3.9-4.1 seconds. Using the method as prescribed by CPRI Specification v7.0 for a non-fronthaul network, both tend to reach at a common match. If the match does not happen in one iteration of 3.9-4.1 seconds, the procedure is repeated again.

However, in a fronthaul network, when using current CPRI link negotiation processes as prescribed by CPRI Specification v7.0, the following can occur:

1. The REC will start at one rate and the Proxy Slave will engage in local CPRI negotiations with the REC. A common match will be found during this negotiation. However, the Proxy Slave still needs to involve the RE in this process.
2. At this stage, the Proxy Slave will start communications towards the Proxy Master (and the RE) using the same rate. The problem here is that the Proxy Master is also not tuned for this rate at this point.
3. As an example, the Proxy Master may also tune to this same rate using some out-of-band control channel communication with the Proxy Slave, the Proxy Master then needs to involve RE in this procedure. The time taken in this communication is a key variable affecting the whole end-to-end negotiation.
4. At this stage, the Proxy Master will first need to ensure that this above rate is supported at the RE using the same CPRI link negotiation procedure.
5. Carrying out the steps 2-4 will take time and due to the delay, what will happen is that the REC (the original Master) will have moved to a different bit rate already by the time the Proxy Slave and the RE reaches a common rate. Thus, this whole procedure will be repeated again and again. It should be noted that there is only the prescribed window of 0.9-1.1 seconds in which steps 2-4 need to be carried out in order for the HFN sync to be achieved between REC and RE, otherwise the overall negotiation may not be achieved at all.

One possible solution arriving at a common link rate on all nodes including the REC and RE in the CPRI path flow may be to use a manual static configuration at all CPRI endpoints and the intermediate CPRI interfacing nodes; however, such a solution is error prone, inefficient at times, and not scalable.

One solution to overcome these hurdles by providing a mechanism to provide CPRI link auto-negotiation between an REC and an RE in an Ethernet-based fronthaul network. A CPRI link for a fronthaul network is a cross product of CPRI and Ethernet as the end-to-end nodes (REC/RE) use CPRI only to communicate with each other via the proxy nodes, which perform mapping/de-mapping and link monitoring operations. Thus, embodiments described herein may facilitate end-to-end CPRI link auto-negation and synchronization between an REC and an RE in which the REC represents one end and the RE represents another end of the end-to-end CPRI link auto-negotiation and synchronization.

Figure 2:
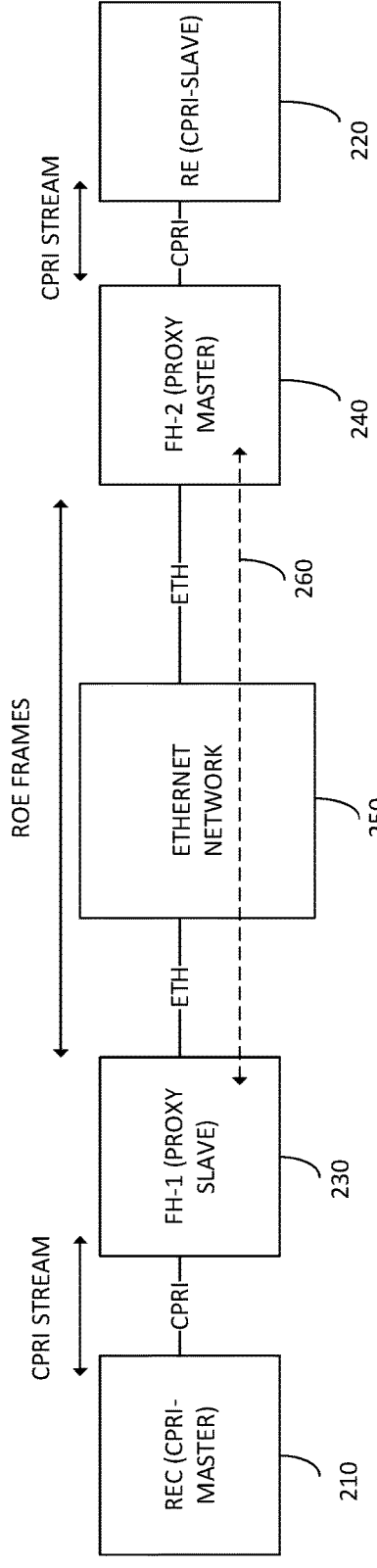
FIG. 2 is a simplified diagram illustrating example details associated with an Ethernet-based fronthaul network in which techniques to provide link auto-negotiation between a radio equipment controller and a radio equipment may be implemented, according to an example embodiment.

FIG. 2 is a simplified diagram illustrating example details associated with an Ethernet-based fronthaul network in which techniques to provide link auto-negotiation between a radio equipment controller and a radio equipment may be implemented, according to an example embodiment. FIG. 2 includes REC 210, RE 220, a Proxy Slave 230, a Proxy Master 240, and an Ethernet network 250. As referred to herein, REC 210 may also be referred to as the 'CPRI Master' and RE 220 may be referred to as the 'CPRI Slave'. Further as referred to herein, Ethernet-based fronthaul network 200 may be referred to as fronthaul network 200.

As noted above, in some examples, REC210 can be a base band unit (BBU) of a cellular base station and RE 220 can be a remote radio headend (RRH) of the cellular base station. The cellular base station can be a 4G/LTE base station, a 5G e-NodeB, etc.

In one example, at least one CPRI interface element/port may be configured for each of Proxy Slave 230 and Proxy Master 240 in which the CPRI port state machine may be configured for the at least one CPRI interface element/port for each of Proxy Slave 230 and Proxy Master 240. In at least one embodiment, at least one Ethernet interface element/port may also be configured for each of Proxy Slave 230 and Proxy Master 24 to facilitate communications via Ethernet network 250.

As illustrated in FIG. 2, the interconnection between REC 210 and Proxy Slave 230 is a CPRI interconnection, the interconnection between Proxy Slave 230 and Ethernet network 250 is an Ethernet interconnection, the interconnection between RE 220 and Proxy Master 240 is a CPRI interconnection, and the interconnection between Proxy Master 240 and Ethernet network 250 is an Ethernet interconnection. REC 210 may further interface with a 3GPP mobile core network (not shown).

Proxy Slave 230 is an Ethernet node connected directly to REC 210 and also to Ethernet network 250. Proxy Slave 230 is capable of performing CPRI mapping and de-mapping for various communications/operations within fronthaul network 200, as discussed herein. Proxy Master 240 is an Ethernet node connected directly to RE 220 and also to Ethernet network 250. Proxy Master 240 is capable of performing CPRI mapping and de-mapping for various communications/operations, as discussed herein. Proxy Slave 230 and Proxy Master 240 may interface with each other using Ethernet-based communications using Ethernet network 250.

RoE frames encapsulated within Ethernet frames may be utilized for communications of radio data to/from REC 210 and RE 220 in which Proxy Slave 230 and Proxy Master 240 can map/de-map CPRI bit streams to/from RoE frames for communications across Ethernet network 250 and with each of REC 210 and RE 220 (e.g., via the CPRI interconnection between Proxy Slave 230 and REC 210 and also via the CPRI interconnection between Proxy Master 240 and RE 220) to facilitate end-to-end communications between REC 210 and RE 220.

Communications involving RoE frames are referred to herein as 'in-band' RoE communications. Ethernet-based communications between Proxy Slave 230 and Proxy Master 240 may also include 'out-of-band' communications, which may be used to facilitate various link auto-negotiation operations and communications performed by Proxy Slave 230 and Proxy Master 240, as described herein.

As noted above, the structure-agnostic RoE mapper is considered for embodiments described herein. Thus, L1 link auto-negotiation communications between Proxy Master 240 and Proxy Slave 230 as described for embodiments herein cannot be provided within in-band RoE control packets of Ethernet frames using the structure-agnostic RoE mapper.

Accordingly, for L1 link auto-negotiation operations described herein, an out-of-band control channel 260 may be configured between Proxy Slave 230 and Proxy Master 240 to facilitate out-of-band RoE communications between Proxy Slave 230 and Proxy Master 240. In at least one embodiment, a Type-Length-Value (TLV)-based out-of-band control protocol, referred to herein as an out-of-band 'RoE Management protocol', may facilitate communicating various information, parameters, indications, etc. between Proxy Slave 230 and Proxy Master 240 for link auto-negotiation operations discussed herein using out-of-band control channel 260. Thus, by 'out-of-band', it is meant that certain communications between Proxy Slave 230 and Proxy Master 240 used to facilitate various L1 link auto-negotiation operations discussed herein are out-of-band from the in-band RoE frame communications between Proxy Slave 230 and Proxy Master 240 that may be performed according to the IEEE 1914 standards.

In one example, the following operations may provide a method to achieve link auto-negotiation between REC 210 and RE 220 in Ethernet-based fronthaul network 200:

1. Use of the TLV-based out-of-band control protocol (RoE Management Protocol) communications between Proxy Slave 230 and Proxy Master via out-of-band control channel 260 of fronthaul network 200. For example, the CPRI link entity (e.g., CPRI interface logic and CPRI port) on Proxy Slave 230 can send negotiated link parameters to the relevant RoE peer (e.g., Proxy Master 240) using out-of-band TLV-based RoE Management Protocol communications. Similarly, the Proxy Slave 230 will use out-of-band TLV-based RoE Management Protocol communications to communicate synchronization achievement success or failure. Other communications can be provided, as discussed herein.

2. Use of the following multi-step procedure to achieve end-to-end CPRI link synchronization:
   Step 1: Proxy Master 240 and RE 220 L1 synchronization;
   Step 2: Proxy Master 240 and Proxy Slave 230 communication (via the RoE Management Protocol) about negotiated link bandwidth; and
   Step 3: Proxy Slave 230 and REC 210 L1 synchronization.

In at least one embodiment, Steps 1-3 may be performed using various operations, as discussed in (1)-(4), below. Note, the broad, multi-step procedure described via Steps 1-3, above, may align with different operations (1)-(4), as discussed below. In at least one embodiment, operations (1)-(4) may include:

(1) At the RE 220 end, Proxy Master 240 initiates an auto negotiation with RE 220.
   1.1. At some point, Proxy Master 240 arrives at one common matching link bit rate with RE 220 from its capability set.
   1.2. After achieving L1 synchronization with RE 220, Proxy Master 240 resets the CPRI link with RE 220 and sends the negotiated link bit rate to the Proxy Slave 230 node using a TLV-based out-of-band control channel 260 communication.

(2) Proxy Slave 230, on learning the RE 220 side negotiated link bit rate, uses the same link bit rate in link negotiations with REC 210 for ongoing REC 210 initiated L1 synchronization attempts.
   2.1. During the operations at (2), Proxy Slave 230 uses only one link bit rate, the link bit rate that it learnt from the Proxy Master 240, for the L1 synchronization attempts with the REC 210.
   2.2. After achieving the L1 synchronization and transmitting 10 hyper frames, Proxy Slave 230 tears down the link with REC 210 by stopping its transmissions towards REC 210, which will trigger REC 210 to start link re-establishment.
   2.3. At this stage, a common matching and possibly the highest link bit rate is known at REC 210, RE 220, Proxy Slave 230, and Proxy Master 240.

(3) At this stage, based on determining the common matching link bit rate between REC 210, Proxy Slave 230, Proxy Master 240, and RE 220 as per (1) and (2), Proxy Slave 230 only uses this link bit rate to receive the CPRI bit stream from REC 210 when REC 210 starts the link re-establishment and uses this same link bit rate for link auto-negotiations (e.g., as per CPRI Specification v7.0).

3.1. The Proxy Slave 230 on achieving the byte and frame alignment from the received CPRI bit stream, since both transmitter and receiver rates are matching, sends the CPRI bit stream (after mapping to RoE frames) to Proxy Master 240 via Ethernet network 250.

3.2. Upon receiving the RoE frames, the Proxy Master 240 de-maps the RoE frames to a CPRI bit stream and plays out (e.g., transmits) the CPRI bit stream to RE 220 using the same link bit rate, which then enables the RE 220 to achieve L1 synchronization eventually using the steps of link auto-negotiation as discussed above per CPRI Specification v7.0, with the original source of the received CPRI bit stream, which is REC 210.

During the operations at (3), Proxy Slave 230 and Proxy Master 240 will act as a passive CPRI mapper and de-mapper, respectively, and allow end-to-end link synchronization operations to be performed between REC 210 and RE 220 as per the process prescribed by CPRI Specification v7.0.

(4) In case operations at 2.2 fail and the L1 synchronization is not achieved between REC 210 and Proxy Slave 230 due to REC 210 not supporting the link bit rate learnt by Proxy Slave 230 from Proxy Master 240 (e.g., discussed at operations 1.2 and 2.1), the below operations can be repeated:

4.1. Proxy Slave 230 will communicate to Proxy Master 240, using a TLV-based out-of-band control channel 260 communication, to re-initiate the link negotiation between Proxy Master 240 and RE 220 to determine a different link bit rate than the one attempted earlier.

4.2. Proxy Master 240 will start the re-negotiations from operations at (1) after excluding any earlier negotiated link bit rates between the Proxy Master 240 and the RE 220. A subsequent successful L1 synchronization between Proxy Master 240 and RE 220 should yield a different negotiated link bit rate, which can be used by Proxy Slave 230 to attempt to achieve link synchronization with the REC 210.

In at least one embodiment, the specific roles assumed by Proxy Master 240 and Proxy Slave 230 in the operations at (1) and (2), respectively, for taking an active role in the L1 synchronization and the passive role played by these nodes in the operations at (3) may be implemented as part of an overall end-to-end distributed state machine, which may facilitate link establishment between REC 210 and RE 220 for Ethernet-based fronthaul network 200.

Figure 3:
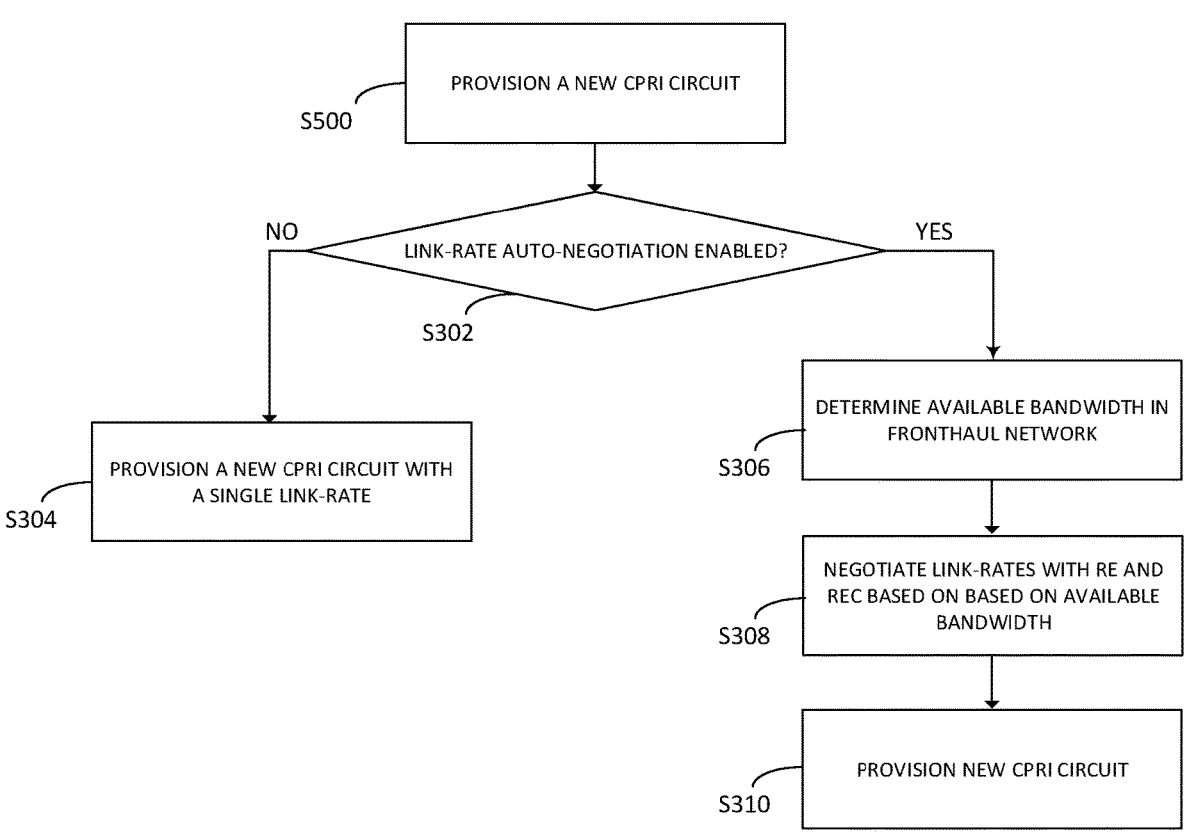
FIG. 3 illustrates an example method of CPRI link-rate auto-negotiation based on available bandwidth, according to some aspects of the present disclosure.

In example process for link auto-negotiation between REC 210 and RE 220 as described above, the available bandwidth between proxy slave 230 and proxy master 240 is not taken into consideration. Therefore, a negotiated link rate may in fact be higher that the available bandwidth between proxy slave 230 and proxy master 240. This may put the CPRI circuit in a Los of Signal (LOS)/Loss of Frame (LOF) state thus rendering it unusable. FIG. 3 describes a process whereby, any negotiated link-rate is subject to the available bandwidth between proxy slave 230 and proxy master 240.

FIG. 3 illustrates an example method of CPRI link-rate auto-negotiation based on available bandwidth, according to some aspects of the present disclosure. The process of FIG. 3 may be performed by any one of proxy slave 230 and proxy master 240. For illustrative purposes, process of FIG. 3 will be described from the perspective of proxy master 240.

At S300, proxy master 240 (first proxy element) may determine that a new CPRI circuit is to be provisioned. The determination as to whether a new CPRI circuit is to be provisioned may be based on level of data traffic to be exchanged over fronthaul network 200 according to any known or to be developed method.

At S302, proxy master 240 may determine whether link-rate auto-negotiation is configured for provisioning a new CPRI circuit. Auto-negotiation may be configured with a list of one or more possible link-rates (a list of link-rates). For example, such list may include [2457 Mbps, 4915 Mbps, 9830 Mbps, 10137 Mbps].

If auto-negotiation is not configured, at S304, a new CPRI circuit will be provisioned with a single CPRI rate (link-rate). This provisioning may be manual and done by a network operator.

If link-rate auto-negotiation is configured, at S306, proxy master 240 determines available bandwidth in the fronthaul network 200 between proxy master y 240 and proxy slave 230. In one example, the available bandwidth may be determined as total interface bandwidth minus a current load of traffic between proxy master 240 and proxy slave 230. In one example, the available bandwidth may alternatively be measured using any other known or to be developed mechanism including SLA, Netflow, RSVP, etc.

In some examples, two different types of CPRI to ROE (Type-0 & Type-1) mapping/demapping may be possible. In Type-0, CPRI to ROE deployment, ROE overheads may be considered (instead of or in addition to with available bandwidth) as constraints to which negotiated link-rates may be subjected. In case of Type-1 deployment, line code information may be removed. A line code is the code used for data transmission of a digital signal over a transmission line. This process of coding is chosen to avoid overlap and distortion of signal such as inter-symbol interference. Removing line code information while converting CPRI to ROE will reduce the total ROE traffic in Ethernet fronthaul network. For Example, if CPRI Rate-7 (9830 Mbps) is converted to ROE using Type-0 method, total ROE traffic may be in the range of 10.1-10.5 Mbps depending on the overheads added. In case of Type-1 method and due to removal of the line code information, total ROE traffic may be within 10 Mbps.

In another example, non-CPRI low-priority traffic may also be deployed in Ethernet Fronthaul network 200. In such case, only the load for high priority CPRI traffic may be considered in determining the available bandwidth using Netflow or Quality of Service (QoS) statistics.

At S308, proxy master 240 and proxy slave 230 will negotiate with RE 220 and REC 210, respectively to select a bandwidth from the available bandwidths determined at S306. In one example, the available bandwidth determined at S306 may be 8000 Mbps. From the example list of [2457 Mbps, 4915 Mbps, 9830 Mbps, 10137 Mbps], only two rates are lower than 8000 Mbps, namely 2457 Mbps and 4915 Mbps. Accordingly, proxy master 240 and proxy slave 230 will negotiate with RE 220 and REC 210, respectively to select either 2457 Mbps or 4915 Mbps for the link-rate of the new CPRI circuit. More generally, proxy master 240 and proxy slave 230 negotiate rates which are less than or equal to the available bandwidth.

Once negotiated and finalized, at S310, proxy master 240 will provision (activate) a new CPRI circuit with a link-rate at the finalized link-rate (e.g., one of 2457 Mbps and 4915 Mbps).

The process of FIG. 3 may be repeated periodically for re-optimization of link-rates for existing CPRI circuits and/or new CPRI circuits such that any increase in fronthaul bandwidth can be propagated to and increase link-rates on the CPRI circuits.

With example embodiments of auto link-rate negotiation in Ethernet-based Fronthaul networks that are subject to available bandwidth described above with reference to FIGS. 1-3, the disclosure now turns to example architecture of network elements and components that may be utilized as any one of the elements in the example Fronthaul network 200 including REC 210, RE 220, proxy slave 230, and/or proxy master 240.

Figure 4:
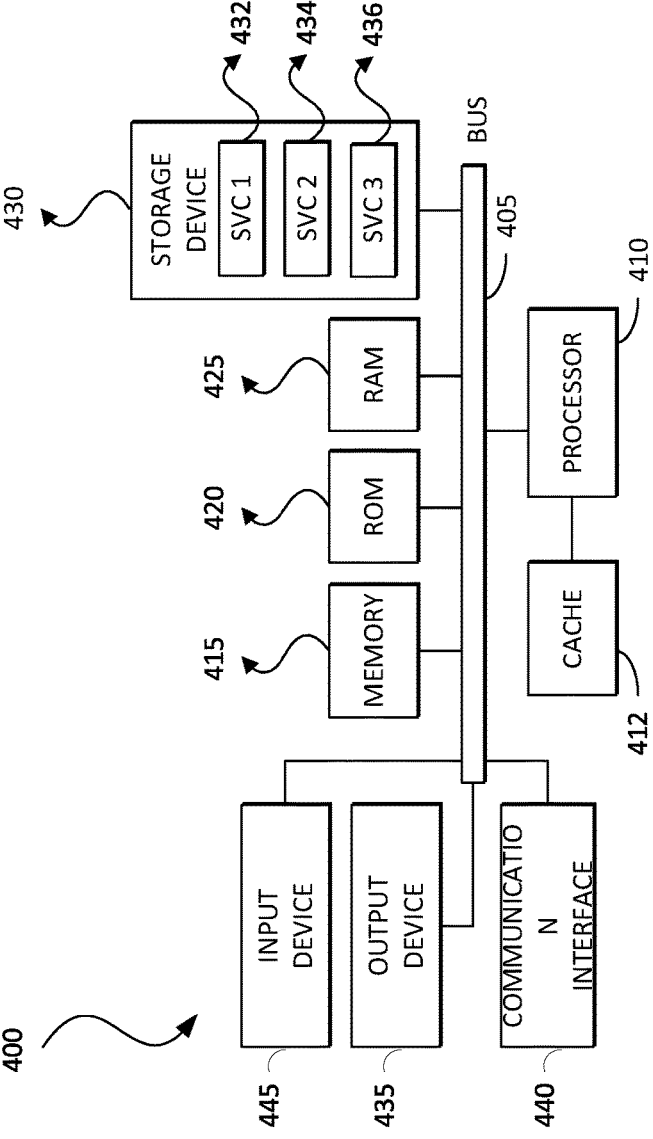
FIG. 4 illustrates an example computing system architecture, according to some aspects of the present disclosure.

FIG. 4 illustrates an example computing system architecture, according to some aspects of the present disclosure; and FIG. 4 illustrates a computing system architecture, according to some aspects of the present disclosure. Components of computing system architecture 400 are in electrical communication with each other using a connection 405, such as a bus. Exemplary system 400 includes a processing unit (CPU or processor) 410 and a system connection 405 that couples various system components including the system memory 415, such as read only memory (ROM) 420 and random access memory (RAM) 425, to the processor 410. The system 400 can include a cache 412 of high-speed memory connected directly with, in close proximity to, or integrated as part of the processor 410. The system 400 can copy data from the memory 415 and/or the storage device 430 to the cache 412 for quick access by the processor 410. In this way, the cache 412 can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware or software service, such as service (SVC) 1 432, service (SVC) 2 434, and service (SVC) 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

Figure 5:
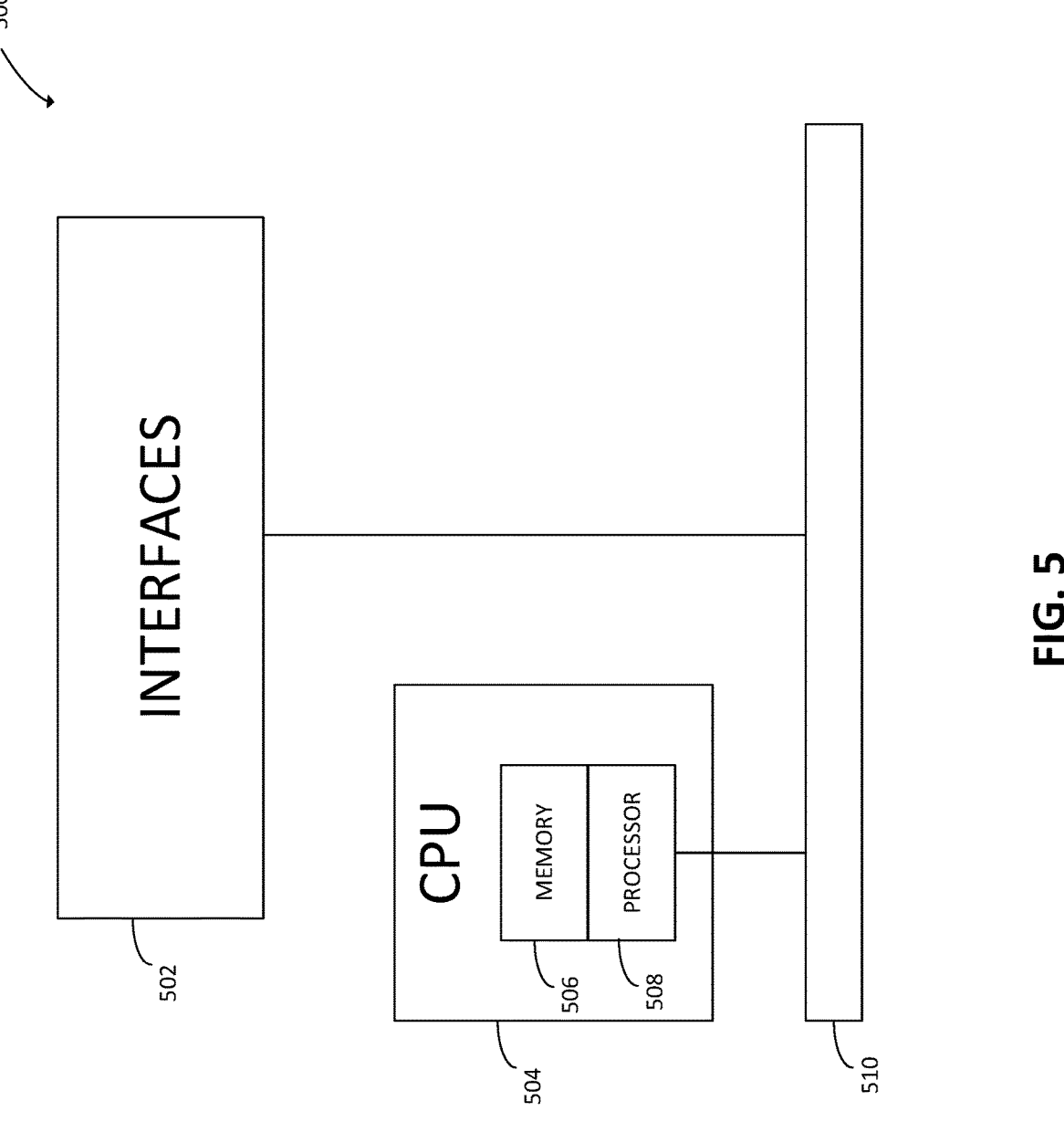
FIG. 5 illustrates an example network device, according to some aspects of the present disclosure.

FIG. 5 illustrates an example network device, according to some aspects of the present disclosure. Example network device 500 can be suitable for performing switching, routing, load balancing, and other networking operations. Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 504 to efficiently perform routing computations, network diagnostics, security functions, etc.

Although the system shown in FIG. 5 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:

determining, at a first proxy element in an Ethernet-based fronthaul network, that a new common public radio interface (CPRI) circuit is to be provisioned for packet exchange between a radio equipment control (REC) element and a radio equipment (RE) element of the Ethernet-based fronthaul network;

determining an available bandwidth as a total bandwidth on an ethernet interface between the first proxy element and a second proxy element minus a current load on the ethernet interface, wherein the current load includes a current load of traffic between the first proxy element and the second proxy element, and wherein the current load of traffic includes a load for high priority CPRI traffic;

determining whether link-rate auto-negotiation is configured for provisioning the new CPRI circuit, wherein auto-negotiation is configured with a list of one or more possible link-rates;

upon determining that the link-rate auto-negotiation is configured for provisioning the new CPRI circuit, identifying, from the list of one or more possible link-rates, one or more candidate link-rates that are each less than the available bandwidth;

performing, by at least one of the first proxy element and the second proxy element, an auto-negotiation for a link-rate for the new CPRI circuit, wherein the link-rate is less than the available bandwidth on the ethernet interface between the first proxy element and the second proxy element, wherein the auto-negotiation includes negotiating to select the link-rate from among the one or more candidate link-rates as a common matching link-rate; and provisioning the new CPRI circuit with the link-rate.

2. The method of claim 1, wherein the first proxy element is a proxy-master element communicatively coupled to the RE element and the second proxy element is a proxy-master element communicatively coupled to the REC element.

3. The method of claim 1, wherein the first proxy element is a proxy-slave element communicatively coupled to the REC element and the second proxy element is a proxy-master element communicatively coupled to the RE element.

4. The method of claim 1, wherein the REC element is a base band unit BBU) of a cellular base station and the RE element is a remote radio headend (RRH) of the cellular base station.

5. The method of claim 1, wherein the first proxy element and the second proxy element are each configured to auto-negotiate the link-rate from among a plurality of rates with a respective one of the REC element and the RE element.

6. The method of claim 5, wherein the link-rate is selected as one of the plurality of rates.

7. The method of claim 1, wherein the current load of traffic includes only the load for high priority CPRI traffic when non-CPRI low-priority traffic is deployed on the Ethernet-based fronthaul network.

8. An Ethernet-based fronthaul network, comprising:

a first network element communicatively coupled to a radio equipment control (REC) element in the Ethernet-based fronthaul network;

a second network element communicatively coupled to a radio equipment (RE) element in the Ethernet-based fronthaul network;

wherein at least one of the first network element and the second network element is configured to:

determine that a new common public radio interface (CPRI) circuit is to be provisioned for packet exchange between the REC and the RE;

determine an available bandwidth as a total bandwidth on an ethernet interface between the first network element and the second network element minus a current load on the ethernet interface, wherein the current load includes a current load of traffic between the first network element and the second network element, and wherein the current load of traffic includes a load for high priority CPRI traffic;

determine whether link-rate auto-negotiation is configured for provisioning the new CPRI circuit, wherein auto-negotiation is configured with a list of one or more possible link-rates;

upon determining that the link-rate auto-negotiation is configured for provisioning the new CPRI circuit, identify, from the list of one or more possible link-rates, one or more candidate link-rates that are each less than the available bandwidth;

perform an auto-negotiation for a link-rate for the new CPRI circuit, wherein the link-rate is less than the available bandwidth on the ethernet interface between the first network element and the second network element, wherein the auto-negotiation includes negotiating to select the link-rate from among the one or more candidate link-rates as a common matching link-rate; and provision the new CPRI circuit with the link-rate.

9. The Ethernet-based fronthaul network of claim 8, wherein the first network element is a proxy-slave element communicatively coupled to the REC element and the second network element is a proxy-master element communicatively coupled to the RE element.

10. The Ethernet-based fronthaul network of claim 8, wherein the REC element is a base band unit (BBU) of a cellular base station and the RE element is a remote radio headend (RRH) of the cellular base station.

11. The Ethernet-based fronthaul network of claim 8, wherein the first network element and the second network element are configured to auto-negotiate the link-rate from among a plurality of rates.

12. The Ethernet-based fronthaul network of claim 11, wherein the link-rate is selected as one of the plurality of rates.

13. The Ethernet-based fronthaul network of claim 8, wherein the first network element and the second network element are configured to auto-negotiate the link-rate with the REC element and the RE element, respectively.

14. One or more non-transitory computer-readable media comprising computer-readable instructions, which when executed by one or more processors associated with a first proxy element or a second proxy element of an Ethernet-based fronthaul network, cause at least one of the first proxy element and the second proxy element to:

determine that a new common public radio interface (CPRI) circuit is to be provisioned for packet exchange between a radio equipment control (REC) element and a radio equipment (RE) element of the Ethernet-based fronthaul network;

determine an available bandwidth as a total bandwidth on an ethernet interface between the first proxy element and the second proxy element minus a current load on the ethernet interface, wherein the current load includes a current load of traffic between the first proxy element and the second proxy element, and wherein the current load of traffic includes a load for high priority CPRI traffic;

determine whether link-rate auto-negotiation is configured for provisioning the new CPRI circuit, wherein auto-negotiation is configured with a list of one or more possible link-rates;

upon determining that the link-rate auto-negotiation is configured for provisioning the new CPRI circuit, identify, from the list of one or more possible link-rates, one or more candidate link-rates that are each less than the available bandwidth;

perform an auto-negotiation for a link-rate for the new CPRI circuit, wherein the link-rate is less than the available bandwidth on the ethernet interface between the first network element and the second network element, wherein the auto-negotiation includes negotiating to select the link-rate from among the one or more candidate link-rates as a common matching link-rate; and provision the new CPRI circuit with the link-rate.

15. The one or more non-transitory computer-readable media of claim 14, wherein the first proxy element is a proxy-master element communicatively coupled to the RE element and the second proxy element is a proxy-master element communicatively coupled to the REC element.

16. The one or more non-transitory computer-readable media of claim 14, wherein the first proxy element is a proxy-slave element communicatively coupled to the REC element and the second proxy element is a proxy-master element communicatively coupled to the RE element.

17. The one or more non-transitory computer-readable media of claim 14, wherein the REC element is a base band unit (BBU) of a cellular base station and the RE element is a remote radio headend (RRH) of the cellular base station.

18. The one or more non-transitory computer-readable media of claim 14, wherein the first proxy element and the second proxy element are each configured to auto-negotiate the link-rate from among a plurality of rates with a respective one of the REC element and the RE element.

* * * * *